(12) United States Patent
Hessheimer

(10) Patent No.: US 10,967,807 B1
(45) Date of Patent: Apr. 6, 2021

(54) SMARTPHONE HOLDING ASSEMBLY

(71) Applicant: Raven Hessheimer, Washington Terrace, UT (US)

(72) Inventor: Raven Hessheimer, Washington Terrace, UT (US)

( * ) Notice: Subject to any disclaimer, the term of this patent is extended or adjusted under 35 U.S.C. 154(b) by 7 days.

(21) Appl. No.: 16/710,571

(22) Filed: Dec. 11, 2019

(51) Int. Cl.
  *B60R 11/02* (2006.01)
  *B60R 11/00* (2006.01)
  *H04M 1/04* (2006.01)
  *F16M 11/04* (2006.01)

(52) U.S. Cl.
  CPC ... *B60R 11/0241* (2013.01); *B60R 2011/0005* (2013.01); *B60R 2011/0075* (2013.01); *F16M 11/041* (2013.01); *H04M 1/04* (2013.01)

(58) Field of Classification Search
  CPC ............ B60R 2011/0005; B60R 11/02; B60R 2011/0075; B60R 11/0241; B60R 2011/008; B60R 2011/0094; B60R 2011/0084; B60K 2370/67; B60K 2370/81; B60K 2370/3704; F16M 13/022
  USPC ......................................................... 224/483
  See application file for complete search history.

(56) References Cited

U.S. PATENT DOCUMENTS

| | | | |
|---|---|---|---|
| 5,109,411 A * | 4/1992 | O'Connell | B60R 11/0241 224/553 |
| 7,062,300 B1 | 6/2006 | Kim | |
| 7,380,759 B1 * | 6/2008 | Whiteside | B60R 11/02 248/183.1 |
| 7,868,585 B2 | 1/2011 | Sarnowsky | |
| 7,900,988 B2 * | 3/2011 | Ryu | B60R 11/0258 296/37.12 |
| 8,172,293 B2 | 5/2012 | Lota | |
| 9,233,649 B2 | 1/2016 | Bisceglia | |
| 9,368,999 B2 * | 6/2016 | Watanabe | H02J 50/10 |
| 9,511,720 B2 | 12/2016 | Harding | |
| D781,773 S | 3/2017 | Kim | |
| 10,155,482 B2 * | 12/2018 | Corso | H04B 1/3877 |
| 10,836,326 B1 * | 11/2020 | Yang | B60R 11/0241 |
| 2007/0087725 A1 * | 4/2007 | Anderson | H04B 1/3816 455/348 |
| 2011/0121148 A1 | 5/2011 | Pernia | |
| 2014/0339847 A1 * | 11/2014 | Brunard | B60R 11/02 296/37.12 |
| 2016/0365744 A1 * | 12/2016 | Hyun | H02J 7/025 |
| 2020/0062191 A1 * | 2/2020 | Ragner | B60R 11/02 |
| 2020/0063911 A1 * | 2/2020 | Xiang | G06F 1/1632 |

\* cited by examiner

Primary Examiner — Adam J Waggenspack

(57) ABSTRACT

A smartphone holding assembly for supporting a personal electronic device in a vehicle includes a drawer that is slidably integrated into a dashboard of a vehicle. A base is coupled to the drawer, a disk is rotatably coupled to the base and the disk is exposed when the drawer is positioned in the extended position. A stand is movably coupled to the disk. The stand is positionable in a deployed position to support a personal electronic device at a preferred angle for viewing during driving. A wireless charger is integrated into the base for charging the personal electronic device. The wireless charger is in electrical communication with a power source comprising the electrical system of the vehicle.

10 Claims, 6 Drawing Sheets

SMARTPHONE HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holding devices and more particularly pertains to a new holding device for supporting a personal electronic device in a vehicle.

(2) Description of Related Art Including Information Disclosed Under 37 CFR 1.97 and 1.98

The prior art relates to holding devices. The prior art discloses a cell phone mount that includes a pole being movably coupled to a dashboard of a vehicle, or alternatively, a lid being hingedly coupled to the dashboard. The prior art discloses a cradle for holding a personal electronic device that is insertable into a cup holder in a vehicle. The prior art discloses a support, integrated into a consol of a vehicle, for receiving a personal electronic device. The prior art discloses a panel, which has a support mechanism for holding a personal electronic device, that is hingedly coupled to dashboard of a vehicle. The prior art discloses a holder that lifts upwardly out of a dashboard of a vehicle for lifting a personal electronic device into view. Several disclosures in the prior art include wireless charging capabilities.

BRIEF SUMMARY OF THE INVENTION

An embodiment of the disclosure meets the needs presented above by generally comprising a drawer that is slidably integrated into a dashboard of a vehicle. A base is coupled to the drawer, a disk is rotatably coupled to the base and the disk is exposed when the drawer is positioned in the extended position. A stand is movably coupled to the disk. The stand is positionable in a deployed position to support a personal electronic device at a preferred angle for viewing during driving. A wireless charger is integrated into the base for charging the personal electronic device. The wireless charger is in electrical communication with a power source comprising the electrical system of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
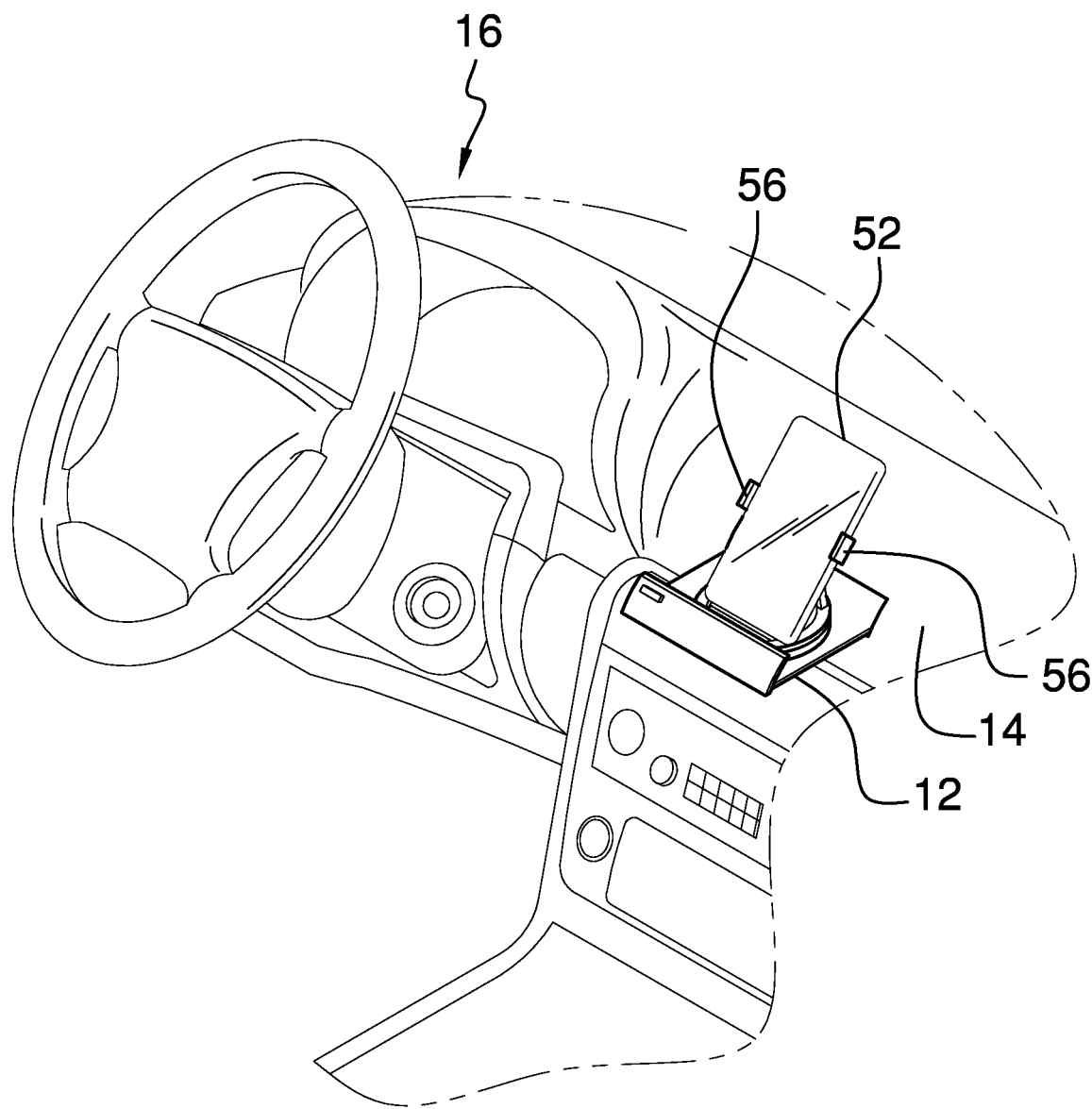
FIG. 1 is a perspective in-use view of a smartphone holding assembly according to an embodiment of the disclosure.
Figure 2:
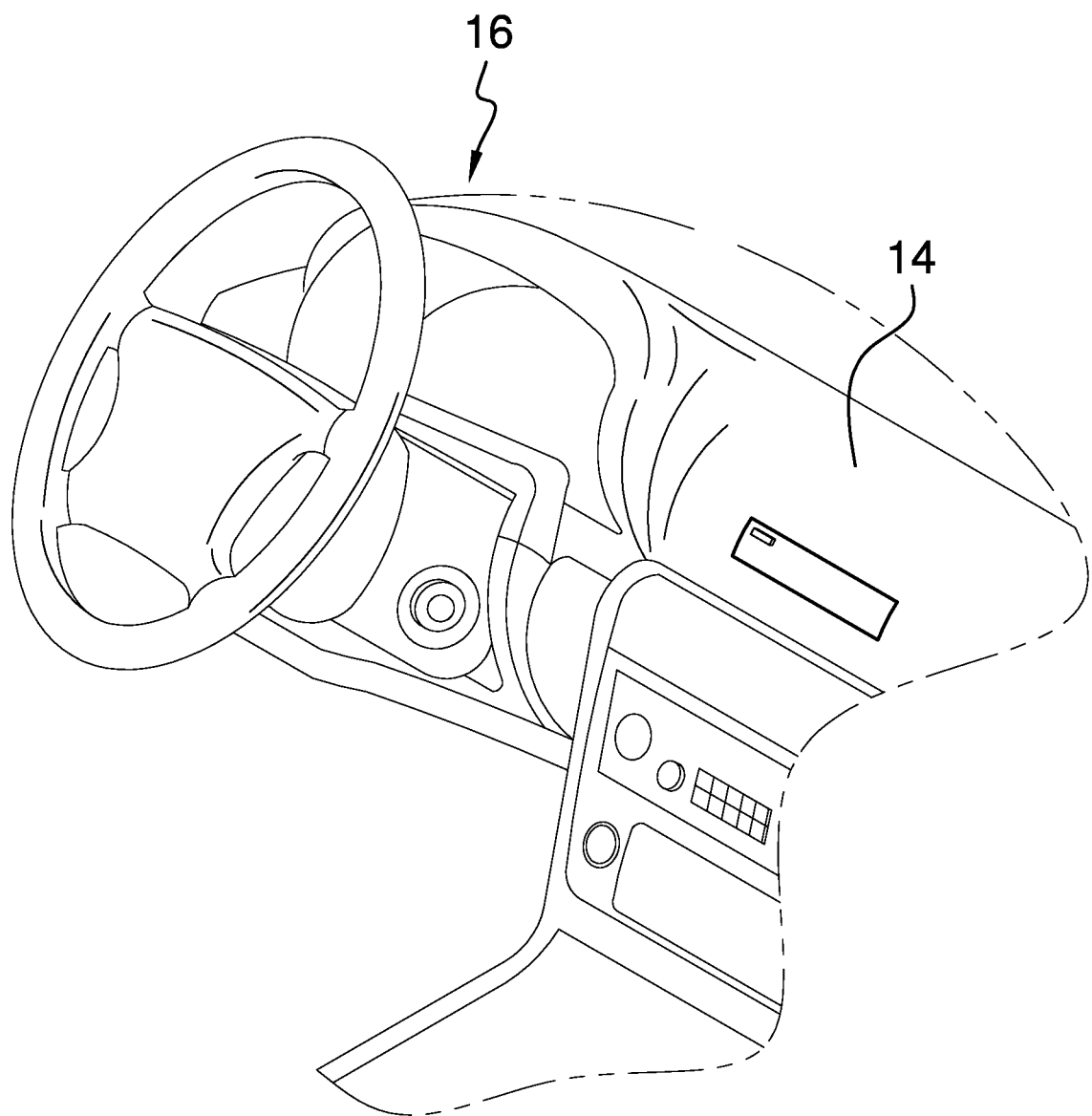
FIG. 2 is a perspective view of an embodiment of the disclosure showing a drawer in a stored position.
Figure 3:
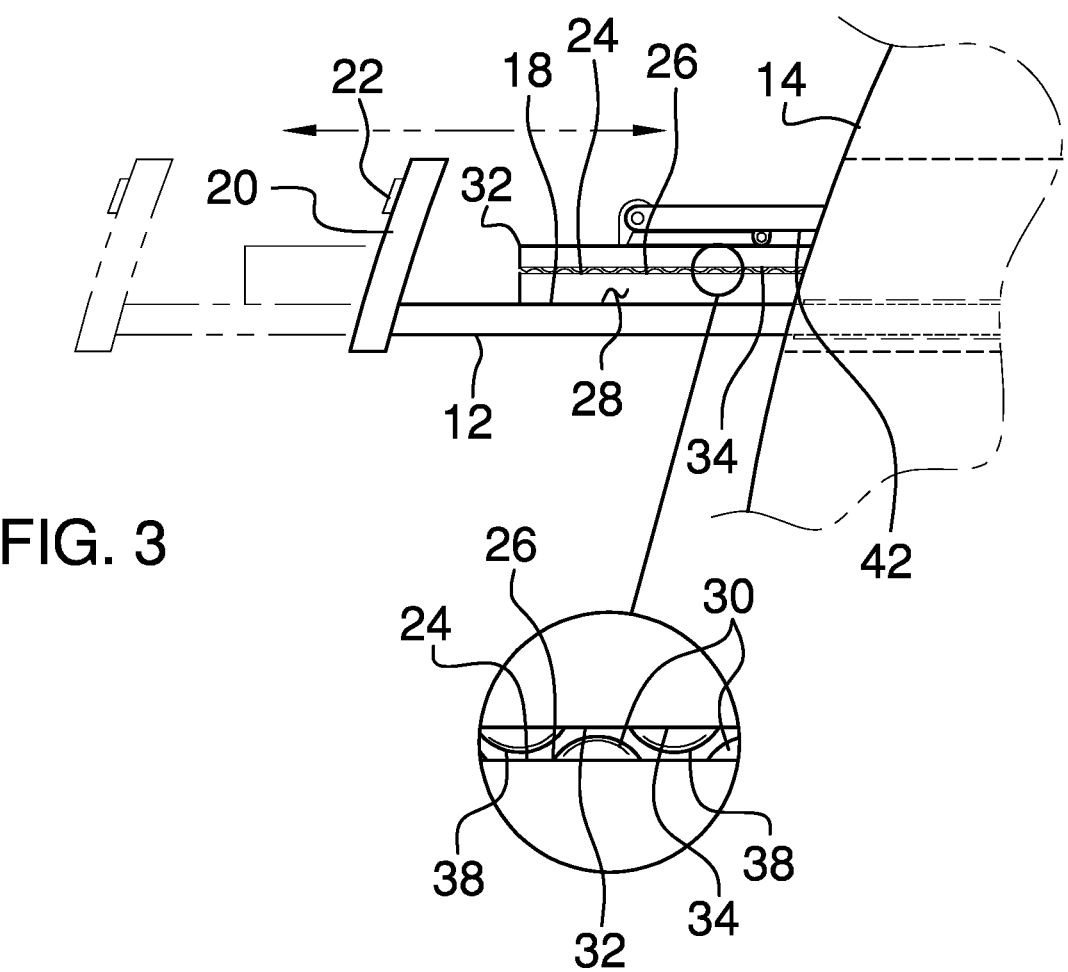
FIG. 3 is a left side view of an embodiment of the disclosure.
Figure 4:
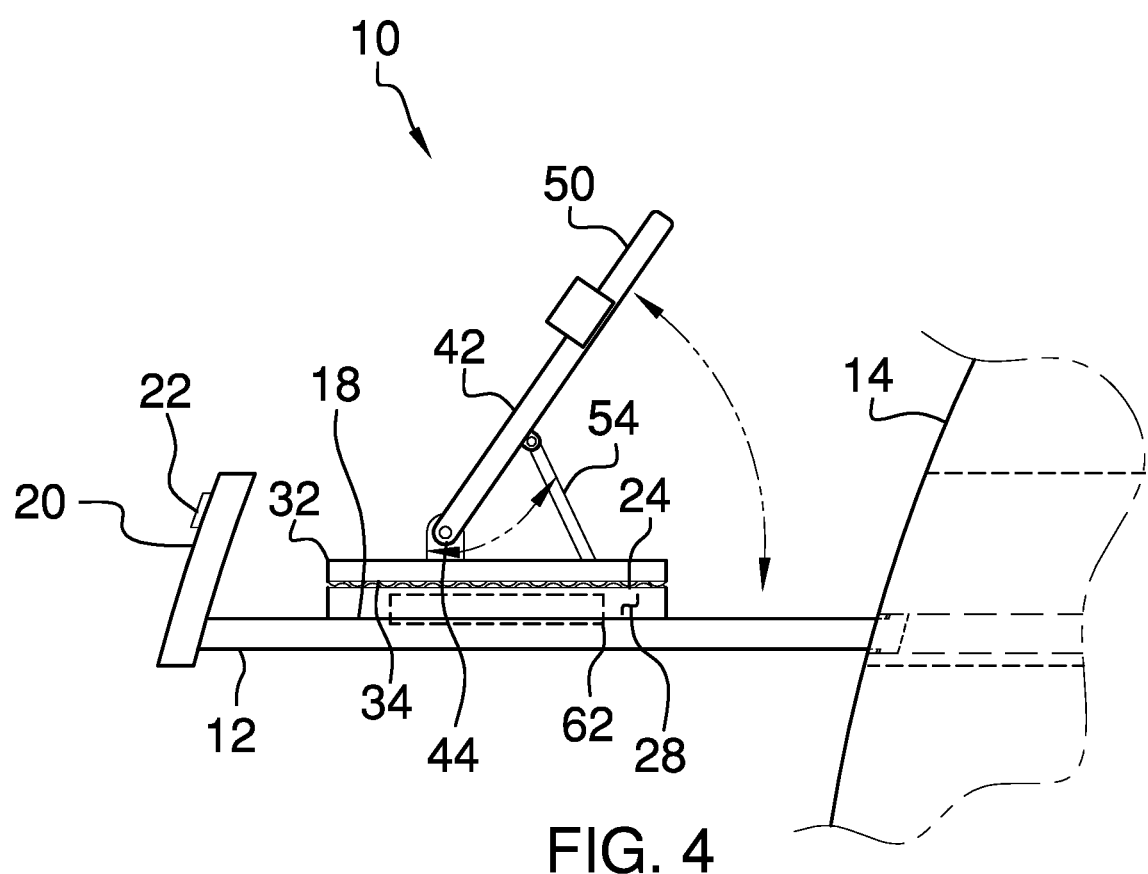
FIG. 4 is a left side view of an embodiment of the disclosure showing a stand being moved into a deployed position.
Figure 5:
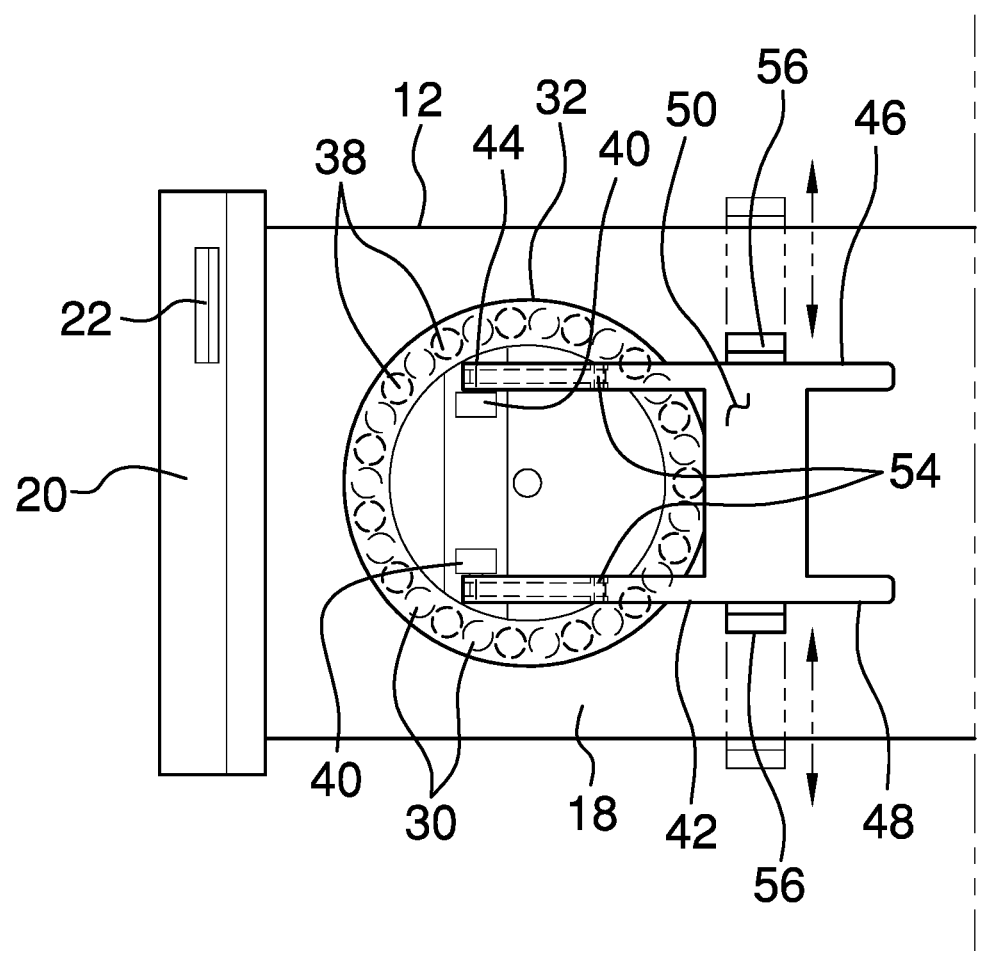
FIG. 5 is a top phantom view of an embodiment of the disclosure.
Figure 6:
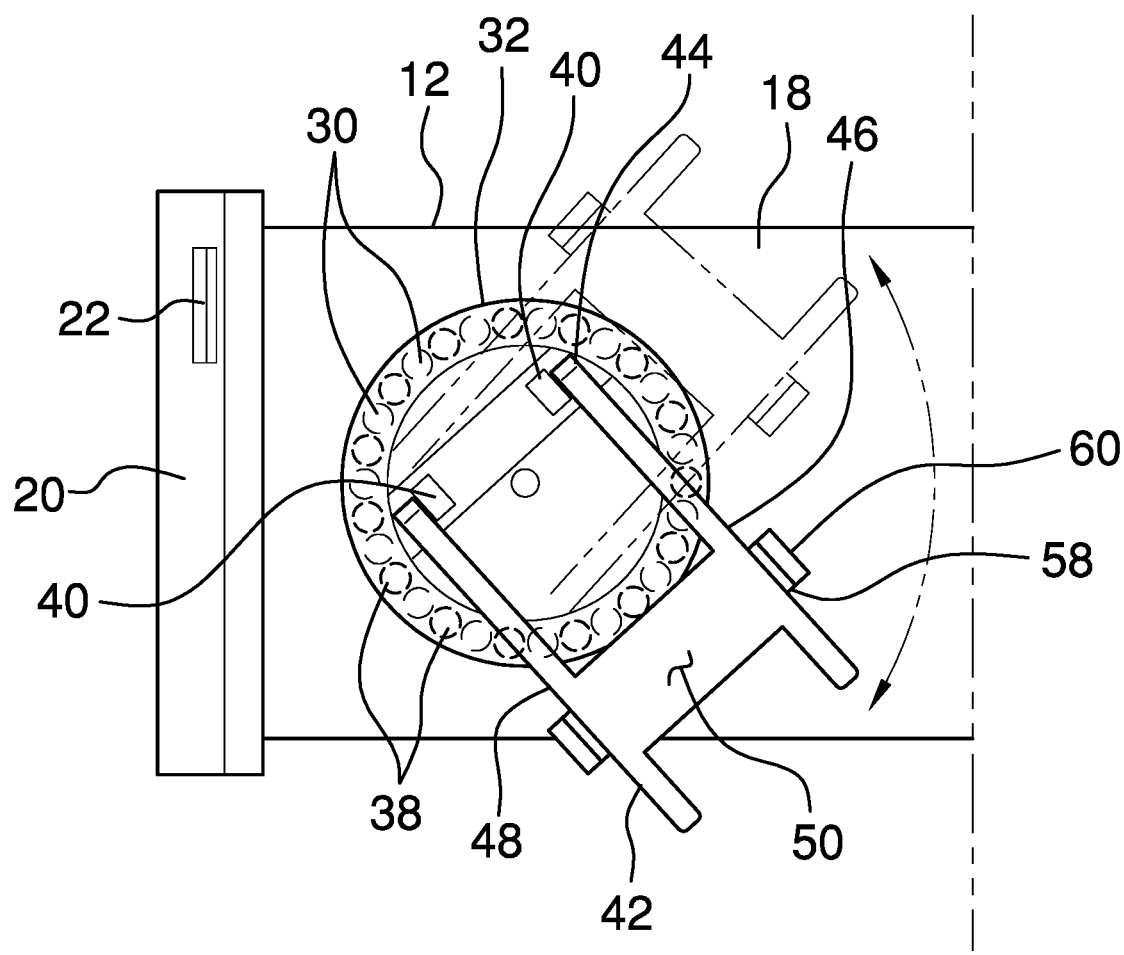
FIG. 6 is a top phantom view of an embodiment of the disclosure showing a disk being rotated on a base.

With reference now to the drawings, and in particular to FIGS. 1 through 6 thereof, a new holding device embodying the principles and concepts of an embodiment of the disclosure and generally designated by the reference numeral 10 will be described.

As best illustrated in FIGS. 1 through 6, the smartphone holding assembly 10 generally comprises a drawer 12 that is slidably integrated into a dashboard 14 of a vehicle 16. The drawer 12 is positionable in an extended position having the drawer 12 extending outwardly from the dashboard 14. Conversely, the drawer 12 is positionable in a stored position having the drawer 12 being recessed into the dashboard 14. The vehicle 16 may be a passenger vehicle, a cargo vehicle or any other type of motorized vehicle that is driven on public roadways. Moreover, the drawer 12 may be a factory installed component of the vehicle 16.

The drawer 12 has a top side 18 and a forward face 20, and the forward face 20 is oriented flush with the dashboard 14 when the drawer 12 is in the stored position. The top side 18 of the drawer 12 is exposed when the drawer 12 is in the extended position, and the drawer 12 is biased into the extended position. The drawer 12 may be biased with a spring or other type of biasing member. A button 22 is movably coupled to the forward face 20 of the drawer 12.

The button 22 engages the dashboard 14 when the drawer 12 is in the stored position. The button 22 disengages the dashboard 14 when the button 22 is depressed to facilitate the drawer 12 to be biased into the extended position.

A base 24 is coupled to the drawer 12 and the base 24 is positioned on the top side 18 of the drawer 12. The base 24 has an upper surface 26 and a perimeter surface 28. The perimeter surface 28 is continuously arcuate about a center of the upper surface 26 such that the base 24 has a disk shape. A plurality of first engagements 30 extends upwardly from the upper surface 26. The first engagements 30 are spaced apart from each other and are distributed around an intersection between the upper surface 26 and the perimeter surface 28. Each of the first engagements 30 may comprise a rounded prominence and each of the first engagements 30 may be comprised of a resiliently compressible material.

A disk 32 is rotatably coupled to the base 24 and the disk 32 is exposed when the drawer 12 is positioned in the extended position. The disk 32 has a bottom surface 34 and a top surface 36, and the bottom surface 34 is spaced from the upper surface 26 of the base 24. A plurality of second engagements 38 extends downwardly from the bottom surface 34 of the disk 32. The second engagements 38 are spaced apart from each other and are distributed around a perimeter of the disk 32. Each of the second engagements 38 releasably engages respective first engagements 30 for retaining the disk 32 at a selected degree of rotation on the base 24. Each of the second engagements 38 may comprise a rounded prominence and each of the second engagements 38 may be comprised of a resiliently compressible material.

A pair of pivots 40 is each coupled to the top surface 36 of the disk 32. A stand 42 is provided and the stand 42 is movably coupled to the disk 32. The stand 42 is positionable in a folded position having the stand 42 lying flat on the disk 32 when the drawer 12 is in the stored position. The stand 42 is positionable in a deployed position having the stand 42 angling upwardly from the disk 32 when the drawer 12 is in the extended position. The stand 42 has a bottom end 44, a first lateral side 46, a second lateral side 48 and a forward surface 50. The bottom end 44 is pivotally coupled to each of the pivots 40 on the top surface 36 of the disk 32. Additionally, the forward surface 50 angles upwardly from the top surface 36 of the disk 32 when the stand 42 is in the deployed position. In this way the forward surface 50 can support a personal electronic device 52, such as a smartphone or the like, at a preferred angle for viewing during driving.

A pair of supports 54 is provided and each of the supports 54 is pivotally coupled between the stand 42 and the top surface 36 of the disk 32. Each of the supports 54 is biased to urge the stand 42 into the deployed position when the drawer 12 is positioned in the extended position. Conversely, each of the supports 54 lies flat against the top surface 36 of the disk 32 when the stand 42 is in the folded position. The supports 54 may be biased with a spring or other type of biasing member.

A pair of grips 56 is each of the grips 56 is slidably coupled to the stand 42 thereby facilitating each of the grips 56 to releasably engage the personal electronic device 52 to retain the personal electronic device 52 on the stand 42. Each of the grips 56 includes a leg 58 and a foot 60. The leg 58 of each of the grips 56 slidably engages a respective one of the first lateral side 46 and the second lateral side 48 of the stand 42. Additionally, the foot 60 on each of the grips 56 is compressible against the personal electronic device 52.

A wireless charger 62 is provided and the wireless charger 62 is integrated into the base 24. The wireless charger 62 is placed in wireless communication with the personal electronic device 52 when the personal electronic device 52 is positioned on the stand 42. In this way the wireless charger 62 can charge a battery in the personal electronic device 52. The wireless charger 62 is in electrical communication with a power source comprising the electrical system of the vehicle 16. The wireless charger 62 may comprise an electromagnetic induction charger or the like.

In use, the button 22 is depressed, the drawer 12 is biased into the extended position and the stand 42 is urged into the deployed position. Thus, the personal electronic device 52 can be laid against the stand 42 and each of the grips 56 is squeezed against the personal electronic device 52. In this way the personal electronic device 52 is retained in a substantially upright orientation for viewing by a driver of the vehicle 16. Additionally, the disk 32 can be rotated to direct the personal electronic device 52 in any direction. The wireless charger 62 charges the personal electronic device 52 while the personal electronic device 52 is positioned against the stand 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smartphone holding assembly being slidably integrated into a dashboard of a vehicle wherein said assembly is configured to position a smartphone within the line of sight of a driver, said assembly comprising:

a drawer being slidably integrated into a dashboard of a vehicle, said drawer being positionable in an extended position having said drawer extending outwardly from the dashboard, said drawer being positionable in a stored position having said drawer being recessed into the dashboard;

a base being coupled to said drawer;

a disk being rotatably coupled to said base, said disk being exposed when said drawer is positioned in said extended position;

a stand being movably coupled to said disk, said stand being positionable in a folded position having said stand lying flat on said disk when said drawer is in said stored position, said stand being positionable in a deployed position having said stand angling upwardly from said disk when said drawer is in said extended position, thereby facilitating said stand to support a personal electronic device at a preferred angle for viewing during driving;

a pair of grips, each of said grips being slidably coupled to said stand thereby facilitating each of said grips to releasably engage the personal electronic device to retain the personal electronic device on said stand; and a wireless charger being integrated into said base, said wireless charger being placed in wireless communication with the personal electronic device when the personal electronic device is positioned on said stand thereby facilitating said wireless charger to charge the personal electronic device, said wireless charger being in electrical communication with a power source comprising the electrical system of the vehicle.

2. The assembly according to claim 1, wherein:

said drawer has a top side and a forward face, said forward face being oriented flush with the dashboard when said drawer is in said stored position, said top side of said drawer being exposed when said drawer is in said extended position, said drawer being biased into said extended position; and a button being movably coupled to said forward face of said drawer, said button engaging the dashboard when said drawer is in said stored position, said button disengaging the dashboard when said button is depressed to facilitate said drawer to be biased into said extended position.

3. The assembly according to claim 2, wherein said base is positioned on said top side of said drawer, said base having an upper surface and a perimeter surface, said perimeter surface being continuously arcuate about a center of said upper surface such that said base has a disk shape.

4. The assembly according to claim 3, further comprising a plurality of first engagements, each of said first engagements extending upwardly from said upper surface, said first engagements being spaced apart from each other and being distributed around an intersection between said upper surface and said perimeter surface.

5. The assembly according to claim 4, wherein:

said disk has a bottom surface and a top surface; and a plurality of second engagements, each of said second engagements extending downwardly from said bottom surface of said disk, said second engagements being spaced apart from each other and being distributed around a perimeter of said disk, each of said second engagements releasably engaging respective first engagements for retaining said disk at a selected degree of rotation on said base.

6. The assembly according to claim 5, further comprising a pair of pivots, each of said pivots being coupled to said top surface of said disk.

7. The assembly according to claim 6, wherein said stand has a bottom end, a first lateral side, a second lateral side and a forward surface, said bottom end being pivotally coupled to each of said pivots on said top surface of said disk, said forward surface angling upwardly from said top surface of said disk when said stand is in said deployed position.

8. The assembly according to claim 7, further comprising a pair of supports, each of said supports being pivotally coupled between said stand and said top surface of said disk, each of said supports being biased to urge said stand into said deployed position when said drawer is positioned in said extended position, each of said supports lying flat against said top surface of said disk when said stand is in said folded position.

9. The assembly according to claim 7, wherein each of said grips includes a leg and a foot, said leg of each of said grips slidably engaging a respective one of said first lateral side and said second lateral side of said stand, said foot on each of said grips being compressed against the personal electronic device.

10. A smartphone holding assembly being slidably integrated into a dashboard of a vehicle wherein said assembly is configured to position a smartphone within the line of sight of a driver, said assembly comprising:

a drawer being slidably integrated into a dashboard of a vehicle, said drawer being positionable in an extended position having said drawer extending outwardly from the dashboard, said drawer being positionable in a stored position having said drawer being recessed into the dashboard, said drawer having a top side and a forward face, said forward face being oriented flush with the dashboard when said drawer is in said stored position, said top side of said drawer being exposed when said drawer is in said extended position, said drawer being biased into said extended position;

a button being movably coupled to said forward face of said drawer, said button engaging the dashboard when said drawer is in said stored position, said button disengaging the dashboard when said button is depressed to facilitate said drawer to be biased into said extended position;

a base being coupled to said drawer, said base being positioned on said top side of said drawer, said base having an upper surface and a perimeter surface, said perimeter surface being continuously arcuate about a center of said upper surface such that said base has a disk shape;

a plurality of first engagements, each of said first engagements extending upwardly from said upper surface, said first engagements being spaced apart from each other and being distributed around an intersection between said upper surface and said perimeter surface;

a disk being rotatably coupled to said base, said disk being exposed when said drawer is positioned in said extended position, said disk having a bottom surface and a top surface;

a plurality of second engagements, each of said second engagements extending downwardly from said bottom surface of said disk, said second engagements being spaced apart from each other and being distributed around a perimeter of said disk, each of said second engagements releasably engaging respective first engagements for retaining said disk at a selected degree of rotation on said base;

a pair of pivots, each of said pivots being coupled to said top surface of said disk;

a stand being movably coupled to said disk, said stand being positionable in a folded position having said stand lying flat on said disk when said drawer is in said stored position, said stand being positionable in a deployed position having said stand angling upwardly from said disk when said drawer is in said extended position, said stand having a bottom end, a first lateral side, a second lateral side and a forward surface, said bottom end being pivotally coupled to each of said pivots on said top surface of said disk, said forward surface angling upwardly from said top surface of said disk when said stand is in said deployed position thereby facilitating said forward surface to support a personal electronic device at a preferred angle for viewing during driving;

a pair of supports, each of said supports being pivotally coupled between said stand and said top surface of said disk, each of said supports being biased to urge said stand into said deployed position when said drawer is positioned in said extended position, each of said supports lying flat against said top surface of said disk when said stand is in said folded position;

a pair of grips, each of said grips being slidably coupled to said stand thereby facilitating each of said grips to releasably engage the personal electronic device to retain the personal electronic device on said stand, each of said grips including a leg and a foot, said leg of each of said grips slidably engaging a respective one of said first lateral side and said second lateral side of said stand, said foot on each of said grips being compressed against the personal electronic device; and a wireless charger being integrated into said base, said wireless charger being placed in wireless communication with the personal electronic device when the personal electronic device is positioned on said stand thereby facilitating said wireless charger to charge the personal electronic device, said wireless charger being in electrical communication with a power source comprising the electrical system of the vehicle.

* * * * *